3,296,256
16-METHYLENE-PROGESTERONES AND INTERMEDIATES IN THE PRODUCTION THEREOF

David Neville Kirk, Vladimir Petrow, Martin Stansfield, and David Morton Williamson, London, England, assignors to The British Drug Houses Limited, London, England, a British company
No Drawing. Filed July 24, 1959, Ser. No. 829,234
Claims priority, application Great Britain, July 25, 1958, 24,077/58
12 Claims. (Cl. 260—239.55)

This invention is for improvements in or relating to organic compounds and has particular reference to a new steroidal hydroxydione (originally believed to be 17α-hydroxy - 6α,16-dimethylpregn-4-ene-3,20-dione) and to acyl esters derived therefrom.

It is an object of the present invention to provide a new steroidal hydroxydione originally believed to be 17α-hydroxy-6α,16-dimethylpregn-4-ene-3,20-dione but now believed to be 17a-hydroxy-6α-methyl-16-methylenepregn-4-ene-3,20-dione having the formula

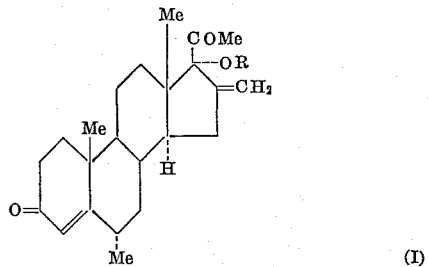

(where R is hydrogen) for reasons hereinunder described.

It is a further object of the present invention to provide novel acyl esters prepared by acylation of the foregoing hydroxydione. These novel acyl esters, originally believed to be 17α-acyloxy-6α,16-dimethylpregn-4-ene-3,20-diones are now believed to be acyl esters having the formula

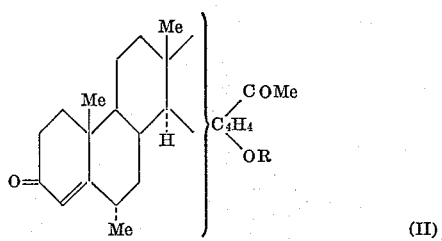

where R is an acyl group containing up to 10 carbon atoms employing as starting material 3β-hydroxy-6,16-dimethyl-pregna-5,16-dien-20-one having the formula

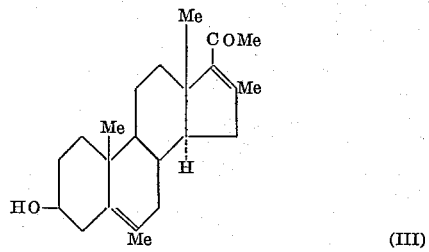

The invention also provides the new compounds:
6α,16 - dimethyl - 16,17 - epoxypregn - 4-ene-3,20-dione which is of value as an intermediate in the present invention, and A new compound originally believed to be 17α-hydroxy-6α,16-dimethylpregn-4-ene-3,20-dione, but now believed to be 17α-hydroxy-6α-methyl-16-methylenepregn-4-ene-3,20-dione (I; R=H), which is of value as an intermediate particularly for conversion into a compound, originally believed to be 17α-acetoxy-6α,16-dimethylpregn-4-ene-3,20-dione, but now believed to have structure (II; R=Ac) which, together with its homologous esters, is of value as a progestational agent.

Thus, for example, in the standard Clauberg assay for the determination of progestational activity it is found that the acetoxydione (II; R=Ac) is more than 100 times as potent as dimethisterone (6α,21-dimethylethisterone; 6α,21-dimethylanhydrohydroxyprogesterone) on oral administration. As dimethisterone is known to be slightly more than 10 times as active as anhydrohydroxyprogesterone (ethisterone) in the Clauberg assay on oral administration it will be readily appreciated by those skilled in the art that the acetoxydione (II; R=Ac) is a progestational agent of quite unusual potency.

Other esters represented by Formula II (where R is an acyl group containing up to 10 carbon atoms) likewise have progesterone-like or progestational activity. The novel compounds represented by Formula II (where R is an acyl group as hereinabove defined) are useful in the treatment of dysmenorrhea, amenorrhea, endometrosis and threatened abortion in both clinical and veterinary practice.

The novel compounds of Formula II (where R is an acyl group as hereinabove defined) of this invention can be prepared and administered to the animal organism in a wide variety of oral and subcutaneous dosage forms singly or in admixture with other coacting compounds. Thus they can be associated with a pharmaceutical carrier which can be a solid material or a liquid in which the compound is dissolved, dispersed or suspended. The solid compositions can take the form of tablets, powders, capsules or pills preferably in unit dosage forms for simple administration or precise dosages. The liquid compositions can take the form of solutions, emulsions, suspensions, syrups or elixirs. The acetoxydione (II; R=AC) is the preferred acyl ester and is preferably administered orally in the form of tablets.

The invention employs as a starting material 3β-hydroxy-6,16-dimethylpregna-5,16-dien-20-one (III) which material can be prepared by condensing 6-methylpregnadienolone with diazomethane to yield the corresponding 3β - hydroxy-6-methyl-16,17(2′,3′-diazacyclopent-2′-eno) pregn-5-en-20-one, which on pyrolysis passes smoothly into the 6,16-dimethylpregnadienolone (III) (above).

According to the present invention there is provided a process for the preparation of 17α-hydroxy-6α-methyl-16-methylenepregn-4-ene-3,20-dione (I; R=H) which comprises oxidising 3β - hydroxy - 6,16-dimethylpregna-5,16-dien-20-one by the Oppenauer procedure to give 6α,16-dimethylpregna-4,16-diene-3,20-dione having the formula

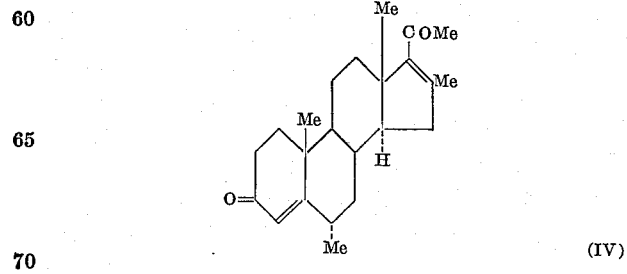

reacting the 6α,16-dimethylpregna-4,16-diene - 3,20-dione with alkaline hydrogen peroxide to give a 16,17-epoxide having the formula

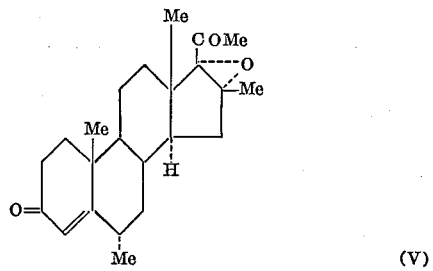

(V)

treating the epoxide with a hydrogen halide and submitting the resultant product to reaction with Raney nickel in an organic solvent.

The resulting compound, originally believed to be 17α-hydroxy-6α,16 - dimethylpregn-4-ene-3,20-dione, but now believed to be 17α-hydroxy-6α-methyl-16-methylenepregn-4-ene-3,20-dione (I; R=H) may be acylated to give an acyloxydione (II; where R has the same meaning as above).

6α,16-dimethylpregna - 4,16 - diene - 3,20-dione is converted into the corresponding 16,17-epoxide by reaction with alkaline hydrogen peroxide in a water-miscible organic solvent, such for example as methanol or ethanol, at temperatures between 0° C. and 100° C. and preferably at the reflux temperature of the reaction mixture.

The epoxy-derivative so obtained is then treated with a hydrogen halide. This transformation is preferably performed with hydrogen bromide in an aliphatic acid, such as acetic acid, mixed with an inert organic solvent such as benzene or dioxan at a temperature which is preferably in the region of 0° C. to 10° C. Alternatively, aqueous hydrogen iodide in a water-miscible organic solvent, such as, for example, dioxan or tetrahydrofuran at temperatures in the region of 0° C. to 10° C. may be employed.

The product so obtained is treated with Raney nickel in an organic solvent such as ethanol or acetone at the ambient temperature to yield the 17α-hydroxy-6-methyl-16-methylenepregn-4-ene-3,20-dione (I; R=H).

Acetylation of the above 17α-hydroxy compound (I; R=H) to give the acetyl compound (II; R=Ac) is performed by methods well known to those skilled in the art. Thus acetylation, for example, may be performed employing an acetylation mixture comprising glacial acetic acid, acetic anhydride and a catalytic quantity of toluene-p-sulphonic acid monohydrate at room temperature or by using a mixture comprising acetic anhydride and a catalytic quantity of toluene-p-sulphonic acid monohydrate.

It is unequivocally established by prior art that 16α,17α-epoxypregnan - 20 - ones (VI) react with hydrogen halides to form 17α-hydroxy-16β - halopregnan-20-ones (VII) which derivatives, on treatment with a catalytic reducing agent, yield the corresponding 17α-hydroxypregnan-20-ones (VIII).

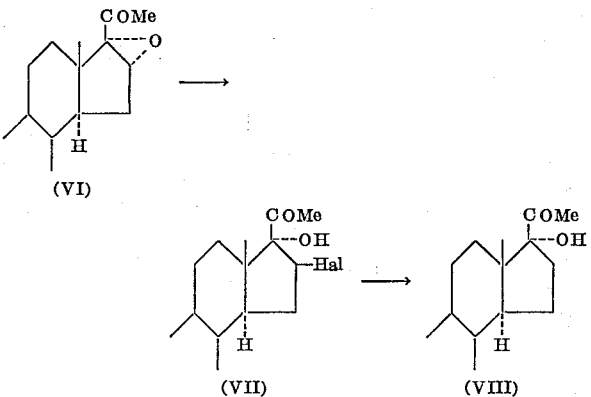

We therefore concluded that extension of this method to the 16-methyl derivative (V) would analogously yield the corresponding 17α - hydroxy-6α,16 - dimethylpregn-4-ene-3,20-dione

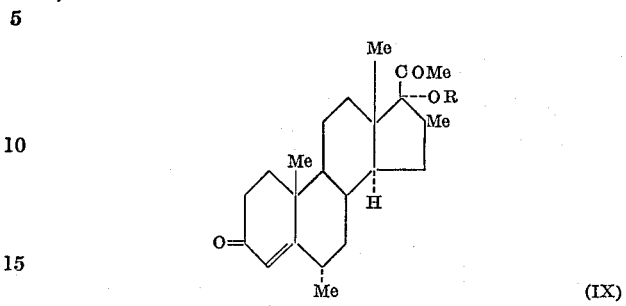

(IX)

(where R is hydrogen) which on enforced acylation would yield the corresponding 17α-acyloxy-16-methyl derivative (IX; R=Acyl). The ultraviolet and infra-red absorption spectra of our acylated product in fact proved to be entirely consistent with the formulation (IX; R= Acetyl), i.e.

| | | |
|---|---|---|
| λEtOH max | 239 mμ | Indicates 3-oxo-Δ⁴. |
| γCHCl₃ max | 1,738 cm.⁻¹ | Indicates acetyl. |
| γCHCl₃ max | 1,715 | Indicates 20–CO. |
| γCHCl₃ max | 1,666 | Indicates 3–CO. |
| γCHCl₃ max | 1,615 | Indicates Δ⁴. |

We therefore concluded that the reactions had proceeded according to the expectation of prior art and formulated our products accordingly.

Subsequently, however, we examined the reaction of the epoxide (V) with sulphuric acid in dioxan, hoping thereby to obtain the corresponding 16-methyl-16,17-diol (X).

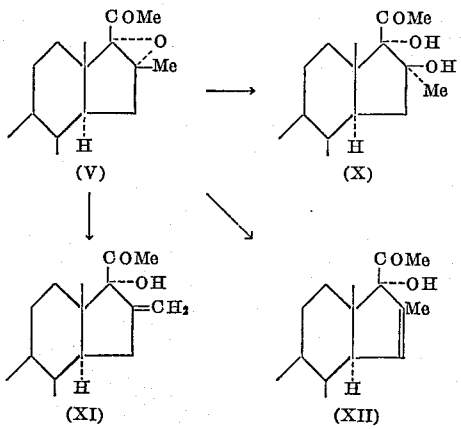

To our surprise the product proved to be identical with the new compound previously formulated as 17α-hydroxy-6α,16-dimethylpregn-4-ene-3,20-dione (IX; R=H) and obtained from the epoxide (V) by successive treatment with a hydrogen halide and Raney nickel. This remarkable observation, which to our knowledge has no exact parallel in prior art, was clearly incompatible with the formulation of the new compound defined as 17α-hydroxy-6α,16-dimethylpregn-4-ene-3,20-dione (IX; R=H), but pointed to its alternative formulation as a 17α-hydroxy-6α - methyl-16 - methylenepregn - 4-ene-3,20-dione (I; R=H, cf. XI) or as the isomer (XII). Formulation (XI) is preferred on theoretical grounds. Its formulation as a conventional D-homo-structure formed from either (X), (XI) or (XII) by molecular rearrangement is regarded as unlikely as reduction of the carbonyl group attached to Ring D, followed by oxidation of the resulting glycol with periodate, leads to a αβ-unsaturated ketone which presumably has partial structure (XIIIa or b).

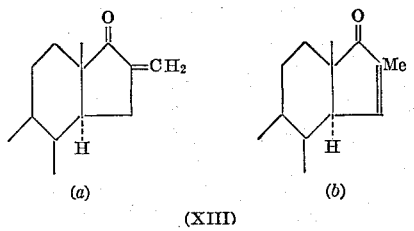

(XIII)

Enforced acetylation of the new compound now believed to be 17α-hydroxy-6α-methyl-16-methylenepregn-4-ene-3,20-dione (I; R=H, cf. XI) yields an acetyl derivative which is a potent orally-active progestational agent. The formulation of the acetyl derivative as 17α-acetoxy-6α,16-dimethylpregn - 4 - ene - 3,20 - dione (IX; R=Ac), must now clearly be revised in the light of the new formulation (I; R=H) for its immediate hydroxylated precursor. Unfortunately, the evidence available at the present time does not permit the conclusion to be drawn that acylation of (I; R=H) necessarily occurs to yield (I; R=Acyl) without concomitant molecular rearrangement. The reason for this doubt is below.

Examination of the acetylated material by the method of nuclear magnetic resonance reveals, inter alia, absorption of 4.6 parts/million relative to tetramethylsilane as internal standard in the olefinic proton region which absorption is believed to indicate (i) The presence in the acylated material of 3 ordinary inactivated protons, preferably attached to cyclohexanic rings, and (ii) The absence of methylene (>C=CH$_2$) which normally shows absorption at 5.2–5.4 parts/million relative to tetramethylsilane as internal standard. In addition, the N.M.R. absorption spectrum appears to indicate the presence of only one Me group (at C$_6$) in the molecule (other than the angular methyl groups at C$_{10}$ and C$_{13}$). These observations are difficult to reconcile with structure (I; R=Ac) for the acetyl-derivative.

It is true that the science and art of nuclear magnetic resonance are still in their infancy, so that conclusions reached on the basis thereof must be accepted with caution. We nevertheless believe that the evidence presented by the N.M.R. determinations does not permit the facile conclusion that the acyl derivatives which form the ultimate products of this invention are represented as simple acyl derivatives (I; R=Acyl) of the hydroxylated precursor (I; R=H). Formulation (II; R=Acyl) is accordingly preferred for these valuable new compounds.

Following is a description by way of example of methods of carrying the invention into effect.

Example 1

(a) *6α,16 - dimethylpregna - 4,16 - diene - 3,20-dione.*—3β-hydroxy-6,16-dimethylpregna-5,16-dien-20-one (1 g.) was dissolved in cyclohexanone (24 ml.) and distilled slowly until 6 ml. of distillate had been collected. Aluminium tert.-butoxide (1 g.) in dry toluene (16 ml.) was added an the reaction mixture heated under reflux for 45 minutes. Rochelle salt solution was then added and the mixture was steam distilled for 4 hours. The steroid was extracted with ether and the ether extracts were washed with water and dried. After removal of the ether the residue was crystallised from methanol to give 6α,16-dimethylpregna-4,16-diene-3,20-dione needles, M.P. 188 to 190° C., $\lambda_{max.}^{EtOH}$ 242 to 244 m$\mu$ $\epsilon$=23,322, [α]$_D^{24}$+65° (c., 0.338 in chloroform).

(b) *6α,16 - dimethyl - 16,17 - epoxypregn - 4 - ene-3,20-dione.*—6α,16-dimethylpregna - 4,16 - diene-3,20 - dione (5 g.) was dissolved in ethanol (50 ml.) containing sodium hydroxide solution (40%) (2.5 ml.) and 30% hydrogen peroxide solution (10 ml.) was added dropwise whilst heating the mixture under reflux. The reaction was kept at the reflux temperature for a further 20 minutes, and then cooled; the product, which crystallised out, was filtered off and recrystallised from methanol to yield 6α,16-dimethyl-16,17 - epoxypregn - 4 - ene-3,20-dione, needles, M.P. 175 to 177° C.

(c) *17α-hydroxy-6α-methyl - 16 - methylenepregn - 4-ene-3,20-dione (I; R=H).*—The above 16,17-epoxide (4 g.) was dissolved in glacial acetic acid (250 ml.) and benzene (100 ml.) and treated at 0° C. with hydrogen bromide in acetic acid (50% w./v.) (6 ml.). The mixture was stirred for 30 minutes and then poured into water and the product isolated with chloroform. The residue from the extracts, was dissolved in acetone (250 ml.) and stirred for 4 hours with Raney nickel (10 gm.) at room temperature. The Raney nickel was filtered off and the acetone was evaporated under reduced pressure. The residue was crystallised from acetone/hexane to give 17α-hydroxy - 6α - methyl - 16 - methylenepregn-4-ene-3,20-dione needles, M.P. 210 to 212° C. [α]$_D^{23}$ −15° (c., 0.598 in chloroform), $\lambda_{max.}^{EtOH}$ 239.5 m$\mu$, $\epsilon$=17,638; $\gamma_{max.}^{CHCl_3}$ 1608, 1661, 1689, 1708, 3485, 3605 cm.$^{-1}$ (d) *Acetyl derivative derived from 17α - hydroxy - 6α-methyl - 16 - methylenepregn - 4 - ene - 3,20 - dione (II; R=Ac).*—17α-hydroxy-6α-methyl - 16 - methylenepregn-4-ene-3,20-dione (I; R=H) (1 g.) and p-toluene sulphonic acid monohydrate (500 g.) were dissolved in glacial acetic acid (40 ml.) and acetic anhydride (8 ml.) and the mixture was left at room temperature for 8 hours. Water was added to the reaction mixture and after standing overnight the product was extracted with ether. The ether extracts were washed with water, sodium bicarbonate solution, water, dried and evaporated under reduced pressure. The residue was crystallised from acetone/hexane to give the acetyl derivative derived from 17α-hydroxy-6α-methyl-16-methylenepregn - 4 - ene-3,20-dione characterised by $\lambda_{max.}^{EtOH}$ 239 m$\mu$, log $\epsilon$=4.19; $\gamma_{max.}^{CHCl_3}$ 1738, 1715, 1666 and 1615 cm.$^{-1}$

Example 2

*Acetyl derivative derived from 17α-hydroxy-6α-methyl-16-methylenepregn-4-ene-3,20-dione (II; R=Ac).*—17α-hydroxy-6α-methyl-16-methylenepregn-4-ene-3,20 - dione (I; R=H) (1 g.) and p-toluene sulphonic acid monohydrate (300 mg.) were stirred at room temperature in acetic anhydride (20 ml.) for 18 hours. The suspension was poured into water and the excess anhydride allowed to hydrolyse. The precipitate was filtered off, washed and dried. It was dissolved in methanol (100 ml.) and treated with potassium hydroxide (0.9 g.) dissolved in water (4 ml.) and methanol (10 ml.) for 7 minutes at room temperature. Acetic acid (2 ml.) was added and the solution evaporated under reduced pressure to a small volume. Water was added and the precipitate was collected and dried. The product was purified by chromatography on an alumina column, when the benzene eluates gave the acetyl derivative derived from 17α-hydroxy-6α-methyl-16-methylenepregn - 4 - ene - 3,20 - dione crystallising in needles from aqueous methanol, M.P. 203 to 207° C., [α]$_D^{22}$ −99° (c., 0.214 in chloroform), $\lambda_{max.}^{EtOH}$ 240 m$\mu$ (log $\epsilon$ 4.19)

Example 3

*Caproyl derivative derived from 17α-hydroxy-6α-methyl - 16 - methylenepregn - 4 - ene - 3,20 - dione (II; R=CO.C$_5$H$_{11}$).*—17α-hydroxy-6α-methyl-16-methylenepregn-4-ene-3,20-dione (1.0 g.) was treated with n-caproic anhydride (22 ml.) and toluene-p-sulphonic acid monohydrate (0.5 g.) for 20 hours at 45° C. Aqueous pyridine was added and the mixture was steam-distilled for 1 hour and the product isolated with ether to give the caproyl derivative derived from 17α-hydroxy-6α-methyl-16-methylenepregn-4-ene-3,20-dione, as a low melting solid characterised by $$\lambda_{max.}^{EtOH}\ 239\ m\mu,\ \log\ \epsilon = 4.2$$

*Example 4*

Formula for 1,000 tablets.

Materials:

| | |
|---|---|
| Acetyl derivative derived from 17α-hydroxy-6α-methyl-16-methylenepregn-4-ene-3,20-dione | 0.5 g. |
| Lactose, B.P. | 125 g. |
| Magnesium stearate | A sufficient quantity. |
| Starch paste, 10% | A sufficient quantity. |
| Starch, B.P. | Sufficient to produce 150 g. |

*Process.*—The steroid, lactose, and two-thirds of the starch were mixed together, moistened with a suitable quantity of starch paste and granulated through a No. 20 mesh screen.

The granule was dried at 50° C., again passed through a No. 20 mesh screen, and the magnesium stearate added, together with sufficient starch to produce the required weight. The granule was compressed to produce tablets each weighing 150 mg.

We claim:

1. A process for the preparation of 17α-hydroxy-6α-methyl-16-methylenepregn-4-ene-3,20-dione which comprises oxidising 3β-hydroxy-6,16-dimethylpregna-5,16-dien-20-one by the Oppenauer procedure to give 6α,16-dimethylpregna-4,16-diene-3,20-dione, reacting the 6α,16-dimethylpregna-4,16-diene-3,20-dione with alkaline hydrogen peroxide to give a 16,17-epoxide, treating the epoxide with a hydrogen halide followed by treatment with Raney nickel in an organic solvent.

2. A process as claimed in claim 1 wherein the 6α,16-dimethylpregna-4,16-diene-3,20-dione is reacted with the alkaline hydrogen peroxide in a water-miscible organic solvent at temperatures between 0° C. and 100° C.

3. A process as claimed in claim 1 wherein the epoxide is treated with hydrogen bromide in an aliphatic acid and an inert solvent.

4. A process as claimed in claim 1 wherein the epoxide is treated with aqueous hydrogen iodide in a water-miscible organic solvent.

5. A process as claimed in claim 1 wherein the reaction with Raney nickel is performed in ethanol.

6. A process wherein the 17α-hydroxy-6α-methyl-16-methylenepregn-4-ene-3,20-dione prepared as claimed in claim 1 is acylated.

7. 17α-hydroxy-6α-methyl-16-methylenepregn-4-ene-3,20-dione.

8. Acyl derivatives wherein the acyl groups have up to 10 carbon atoms derived from 17α-hydroxy-6α-methyl-16-methylenepregn-4-ene-3,20-dione.

9. 6α,16-dimethyl-16,17-epoxypregn-4-ene-3,20-dione.

10. 17α-acetoxy-6α-methyl-16-methylenepregn-4-ene-3,20-dione.

11. 17α-caproyloxy-6α-methyl-16-methylenepregn-4-ene-3,20-dione.

12. In a process for the preparation of 17α-hydroxy-6α-methyl-16-methylene-pregn-4-ene-3,20-dione from 3β-hydroxy-6,16-dimethylpregna-5,16-diene-20-one, the steps comprising selectively epoxidizing the $\Delta^{16}$ double bond with alkaline hydrogen peroxide to give a 16α,17α-epoxide; oxidizing the 3β-hydroxy group by Oppenauer procedure to give the 3-keto-$\Delta^4$ structure, and cleaving the 16α,17α-epoxide with hydrogen bromide.

References Cited by the Examiner

UNITED STATES PATENTS

| | | | |
|---|---|---|---|
| 2,787,623 | 4/1957 | Gebert | 260—397.4 |
| 2,871,246 | 1/1959 | Loken | 260—397.4 |
| 2,878,247 | 3/1959 | Miramontes et al. | 260—239.55 |

LEWIS GOTTS, *Primary Examiner.*

L. H. GASTON, JULIUS FROME, *Examiners.*

M. LIEBMAN, E. ROBERTS, *Assistant Examiners.*